No. 898,011. PATENTED SEPT. 8, 1908.
F. SEIM.
BUTTER GRANULATOR AND PURIFIER.
APPLICATION FILED JAN. 2, 1908.
2 SHEETS—SHEET 2.
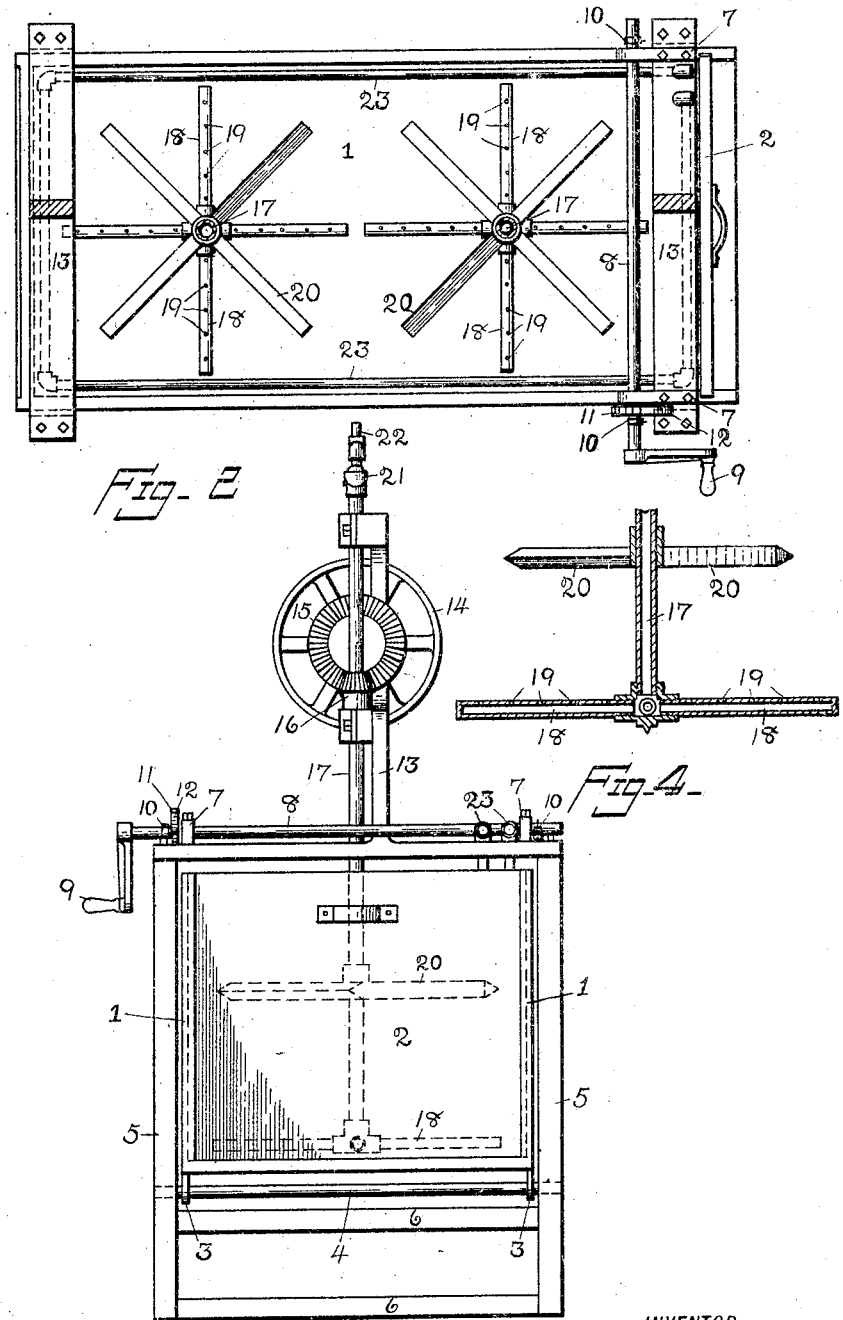
WITNESSES:
John E. Heller.
Minnie C. Rollwage.
INVENTOR
Ferdinand Seim.
BY
Abraham Knobel,
ATTORNEY

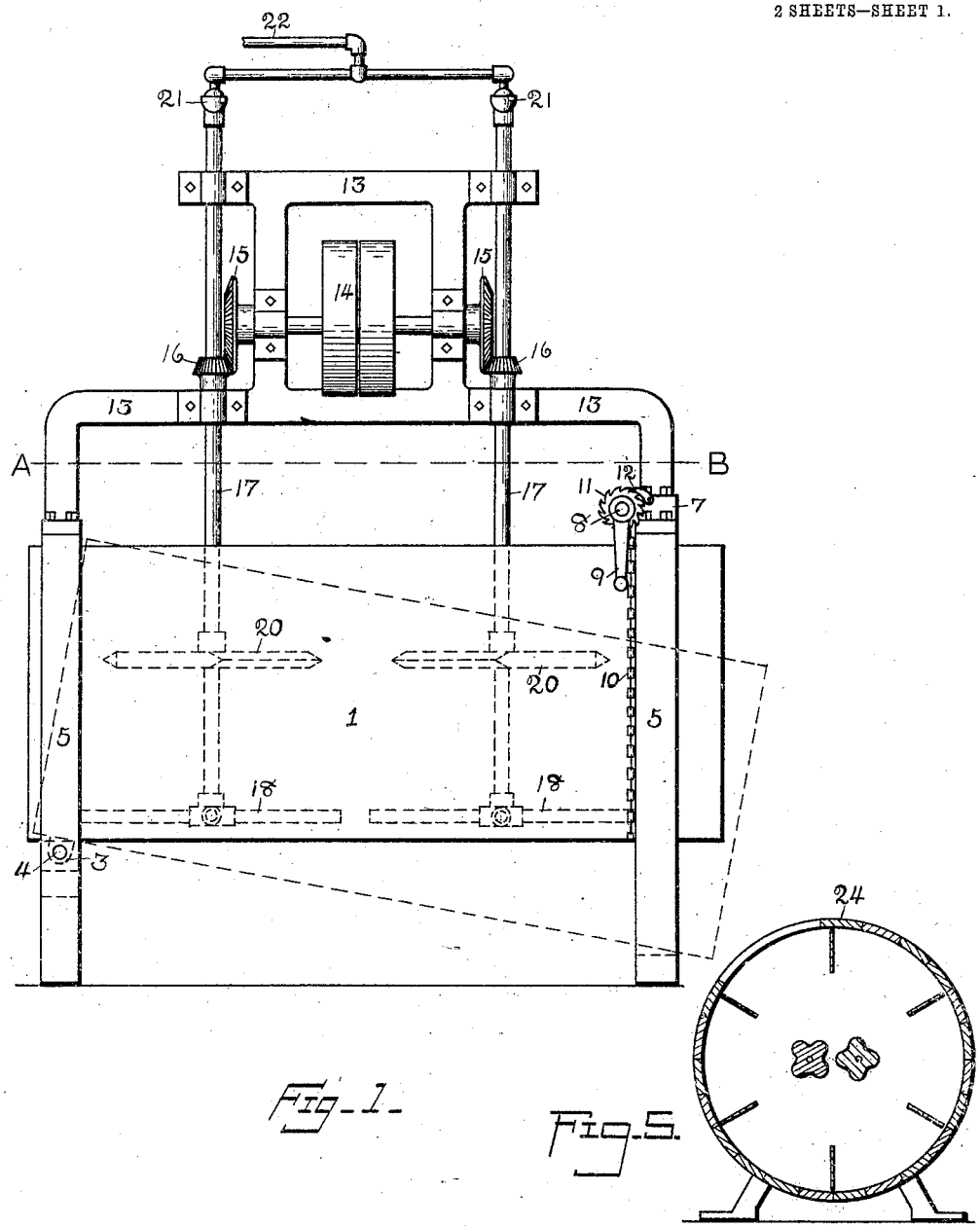

UNITED STATES PATENT OFFICE.

FERDINAND SEIM, OF LOUISVILLE, KENTUCKY.

BUTTER GRANULATOR AND PURIFIER.

No. 898,011.  Specification of Letters Patent.  Patented Sept. 8, 1908.

Application filed January 2, 1908. Serial No. 408,988.

*To all whom it may concern:*

Be it known that I, FERDINAND SEIM, a citizen of the United States, residing at Louisville, in the county of Jefferson and State of Kentucky, have invented a new and useful Butter Granulator and Purifier, of which the following is a specification.

This invention relates to machines for extracting butter from milk and cream, and for purifying butter; and some of the objects of my improvement are, to extract the butter from sweet milk or cream rapidly and with little expenditure of power; to thoroughly aerate the butter produced and the residual milk with pure air, thus purifying both the butter and the milk; to produce butter in the much desired granular form, to thoroughly disintegrate, aerate, wash, and purify old, rancid butter; to regranulate rancid butter thus purified; to take old butter of different qualities and colors, granulate it, and produce therefrom pure butter, homogeneous in quality and color; to produce butter, either from milk or cream, or from impure butter previously made, that is pure and hygienic; simplicity of construction and operation; saving of power and time; and comparative inexpensiveness of manufacture of the machine. These objects I attain by means of the mechanism illustrated in the accompanying drawings in which—

Figure 1 is a side elevation; Fig. 2, a top plan view with the gearing removed, showing the vertical hollow shafts in section; Fig. 3, a front end view; and, Fig. 4, a sectional view of the agitator in elevation. Fig. 5 is a view of the receptacle into which the tank is adapted to discharge.

Similar reference numerals refer to similar parts throughout the several views of the drawings.

A rectangular tank 1 is provided, open at the top, and having a vertically sliding gate or valve 2 or equivalent means for allowing the butter suspended in the liquid to flow out into an adjacent butter worker 24. The tank 1 is preferably mounted at its rear end, by means of pivot brackets 3, on a pivot shaft 4. A stationary frame, consisting of posts 5, cross braces 6, and upper cross bars 7, is provided in which tank 1 is pivotally mounted. The forward end of the tank is provided with means for raising and lowering or tilting which may consist of a transverse shaft 8 above the tank, provided with a crank 9 to rotate it, and a vertical chain 10 at each side of the tank connected at its lower end with the bottom of the tank and at its upper end with shaft 8 so that it may be wound upon the shaft or unwound therefrom, in order to raise or lower the front end of the tank. A ratchet wheel 11 is mounted on shaft 8 and controlled by a pawl 12, in order to hold the tank in the desired position.

Driving mechanism is mounted in a stationary frame, comprising parts 13, which are preferably secured on cross bars 7. Driving mechanism is provided which may be as shown in the embodiment of my invention here illustrated. Pulleys 14, for receiving a belt, one of the pulleys being loose and the other tight, provide means for starting and stopping the agitating mechanism. Bevel gears 15 are mounted on the shaft with pulleys 14 and mesh with bevel pinions 16 on vertical hollow shafts 17 which extend downward within and near the bottom of tank 1. On shafts 17 are mounted, at their lower ends, hollow stirrers or agitators 18. These I prefer to construct of tubing closed at their ends and provided intermediate their ends with perforations 19 for the exit of air therefrom. Above agitators 18 are mounted other agitators or beaters 20 to rotate with shafts 17. Beaters 20 are preferably triangular in cross section, or of any form suitable to thoroughly cut up solid butter that may be placed in the tank. Ball joints or other swivel means, 21, are provided at the upper ends of shafts 17 to permit of air tight connection between a stationary supply pipe 22 and shafts 17, in order that air from a suitable supply may be forced through shafts 17 and agitators 18.

A steam coil 23 is provided, preferably at the bottom of the tank, in order to heat the liquid in the tank by means of steam. A butter-worker 24 of any approved type may be placed, as shown, in proximity with tank 1 and so positioned that when the forward end of the tank is lowered, and gate 2 raised, the butter suspended in the liquid in the tank quickly and readily flows into it, to be worked in the usual manner.

I operate the machine in the following manner. If butter is to be produced from sweet milk or cream, the milk or cream is placed within tank 1 while it is in the horizontal position shown. If it is necessary to raise the temperature, this is done by admitting steam through coil 23 while the agitators are gently rotated. When the required temperature has been attained, the agitators are operated at suitable speed, and at the same time air of suitable temperature, preferably the same temperature as the milk or cream, is injected from agitators 18. The air facilitates the separation of the butter fat from the milk or cream and thus hastens the operation of churning. When the butter has been thoroughly extracted from the milk or cream and is in suitable granular form it is suddenly chilled by injecting cold air through the agitators, the butter thus formed and fixed in granular form is allowed to flow out with the residual milk into the adjacent worker 24 by lowering the forward end of the tank by means of crank 9 and raising gate 2 suddenly. The butter is then gathered and worked in the usual way, and thus butter of the purest and firmest granular quality is easily and quickly produced.

If old butter from various makers and perhaps rancid from age, is to be renovated or purified, pure water, to which a little milk may be added is placed in the tank and raised to a temperature by means of coil 23 sufficient to just soften the butter. The butter is then turned into the tank, the agitators are set rotating at a suitable speed, so that the butter is thoroughly disintegrated and washed in the water. Warm air is at first injected through stirrers 18, so as to thoroughly aerate and remove all effluvia and gaseous impurities from the butter and the circumambient liquid. When it is judged that the butter is thus thoroughly purified and mingled, cold air is injected through the agitators, in order to chill and solidify the butter while the agitators are still rotating. In this way the butter is congealed in granular form. When the granules have attained sufficient firmness and while still suspended in the water, the forward end of the tank is lowered, gate 2 suddenly opened, and the contents of the tank allowed to flow into worker 24, where the butter is worked in the usual way. By this means pure, wholesome, sanitary butter in granular form and of homogeneous color and consistency is produced from the common run of country butter.

Having thus described my invention so that any one skilled in the art pertaining thereto may make and use it, I claim—

In a machine for making and purifying butter, a frame, a tank pivoted therein at one end, and adjustably securable therein at the other end, said tank being provided with a gate at its adjustably secured end, vertical hollow shafts extending into said tank, hollow perforated agitators regularly arranged at the lower ends of said shafts, and connected agitators, a source of air supply to said hollow agitators through said shafts, other agitators on said shafts above said perforated agitators vertically non-alined with the same, and a steam-coil arranged in said tank.

FERDINAND SEIM.

Witnesses:
 D. B. MEDANICH,
 MINNIE C. ROLLWAGE.